Oct. 24, 1944.　　　A. M. STONER　　　2,360,907

DOUBLE ACTING CHUCK

Filed June 10, 1942　　　2 Sheets-Sheet 1

INVENTOR
Arthur Merrick Stoner
BY
E. W. Marshall
ATTORNEY

Oct. 24, 1944.     A. M. STONER     2,360,907
DOUBLE ACTING CHUCK
Filed June 10, 1942     2 Sheets-Sheet 2
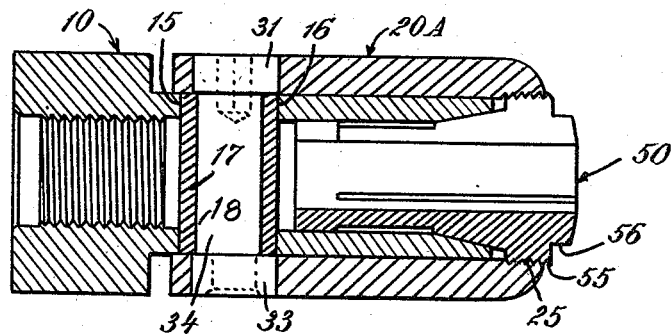
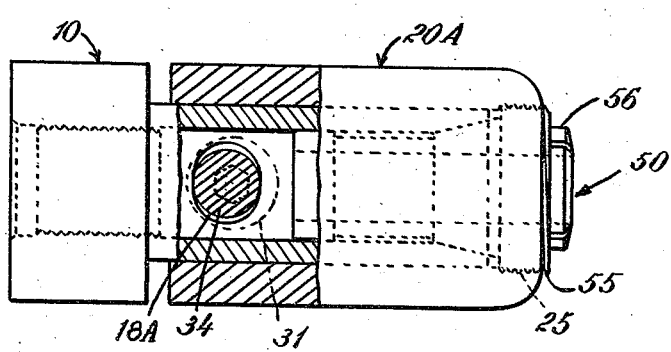
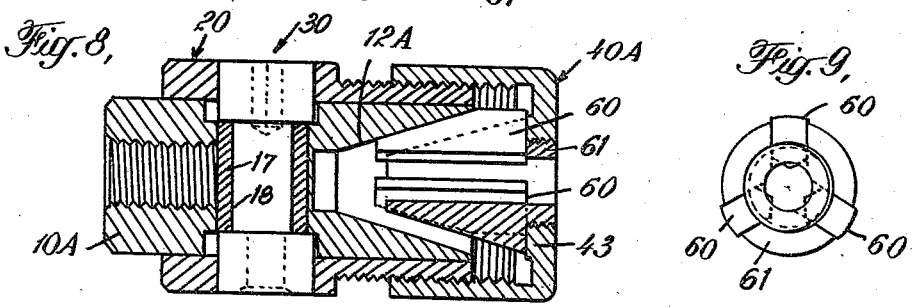 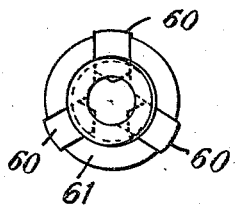
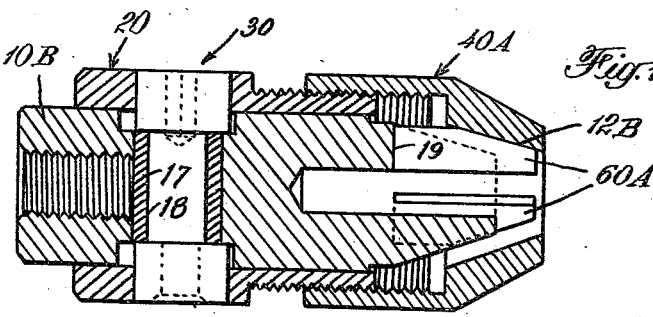
INVENTOR
Arthur Merrick Stoner
BY
E. W. Marshall
ATTORNEY Patented Oct. 24, 1944

2,360,907

UNITED STATES PATENT OFFICE 2,360,907

DOUBLE ACTING CHUCK

Arthur Merrick Stoner, West Hartford, Conn., assignor to The Jacobs Manufacturing Company, Hartford, Conn., a corporation of Connecticut Application June 10, 1942, Serial No. 446,467

13 Claims. (Cl. 279—51)

This invention relates to double acting chuck. In a copending application for patent Serial No. 434,899, filed March 16, 1942, superseded by Serial No. 471,827, filed Jan. 9, 1943, I have disclosed the broad idea of providing a collet chuck in which the collet is screwed into a longitudinally movable member to obtain an initial contact with a tool or other device and is then brought into firm gripping engagement with the device by forcing the movable member with the collet inwardly. The object of the present invention is to provide a simple and inexpensive instrumentality which functions in a similar manner for a collet chuck or chucks of other types. More specifically, its object is to provide a chuck of this character with few parts and rugged construction in which the longitudinally slidable member is on the outside of the body and of which all parts are readily accessible from its front end.

In the drawings,

Fig. 6 is a sectional side elevation of another form of chuck which also embodies this invention;

Fig. 7 is a side elevation partly in section of a simplified modification of the chuck shown in Fig. 6, the view being taken at right angles to that shown in Fig. 6;

Fig. 8 is a sectional side elevation showing the invention embodied in another form of chuck;

Fig. 9 is a front elevation of a jaw spacer and clamping jaws; and

Fig. 10 is a similar view illustrating a still further structural modification.

Figure 1:
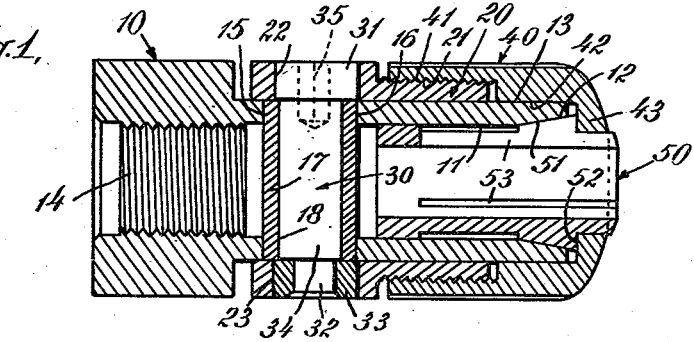
Fig. 1 is a sectional side elevation of a collet chuck which is made according to and embodies my invention.
Figure 2:
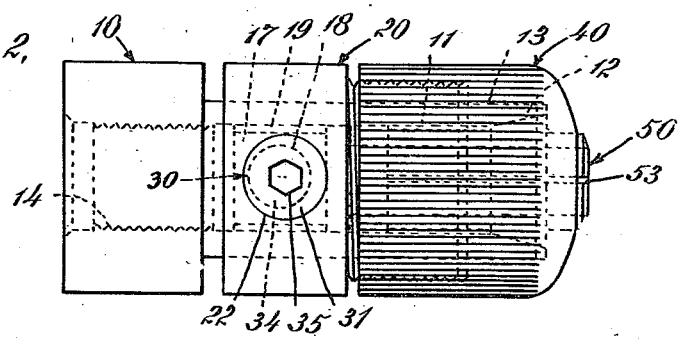
Fig. 2 is a side elevation of the chuck shown in Fig. 1, the view being taken at right angles to that shown in the latter figure.

10 is a hollow cylindrical member which forms the body of the chuck. It has a cylindrical bore 11 which is tapered, as at 12, at its forward end to form an outwardly flaring cam surface. The outside of the body forms a cylindrical surface, as shown at 13. The rear end of the body, which may be of a larger diameter, is provided with internal screw threads 14 for attaching it to a driven part of a machine tool.

In the chucks shown in Figs. 1, 2, 6, 8 and 9 a transverse slot is provided in the body which has flat parallel sides 15, 16 which guide a cross head 17 which has a cylindrical bore 18.

20 is a longitudinally movable drawback member slidably mounted on the cylindrical surface 13 of the body. In the form of chuck shown in Figs. 1, 2, 4, 5, 8 and 10 this member has an externally threaded portion 21. In opposite sides of the drawback member 20 are axially alined circular pockets 22, 23.

30 is a transverse pin having a circular head 31 which is rotatively seated in one of these pockets. The opposite end portion 32 of the pin is of restricted diameter and fits a circular bushing 33, the outer diameter of which is preferably the same as that of the head 31 and is arranged to be seated in the other circular pocket in drawback member 20. The intermediate portion 34 of the pin between the head 31 and the bushing 33 is circular in cross section and fits the bore 18 in the cross head. The axis of this intermediate portion of the pin is offset from the axis of the head and bushing. Its diameter is less than that of the head and bushing and greater than that of the reduced end portion 32. 35 is a polygonally sided recess formed in the head 31 of the pin for the reception of a wrench by means of which the pin may be rotated.

These parts are assembled by passing the pin through one side of the drawback member 20, the body 10, through the bore 18 in the cross head and into the pocket 23 in the other side of the drawback member 20. The bushing is then placed in the pocket 23 and on the restricted end 32 of the pin after which the end of the pin is riveted over the adjacent part of the bushing, as shown in Fig. 1.

40 (Figs. 1, 2, 4 and 5) is a collar, the inner portion of which is provided with threads 41 which engage the threads 21 on drawback member 20 and its outer portion 42 fits the surface 13 of the body. The outer end of the sleeve forms an inwardly projecting flange 43 which overlies the outer end of the body 10.

50 is a collet in the form of a hollow tube having an enlarged conical outer end 51 which fits the tapered bore 12 of the body. The diameter of the outer end of the collet is reduced to form an annular shoulder 52 with which the flange 43 engages. The collet is made also with longitudinal slots 53 which provide for its contraction in the usual manner.

In operation, the pin 30 is rotated to bring the axis of the head and bushing of the pin in front of the axis of its intermediate portion 34. This causes the drawback member 20 to be moved forwardly on the body 10. Then the collet 50 is inserted in the body and the colar 40 screwed onto the drawback member 20. The collet may be moved into initial engagement with a tool or other article by continuing the rotation of the collar by the engagement of its flange 43 with the shoulder 52. The outside of the collar may be knurled or otherwise formed to facilitate this part of the operation. Then the pin 30 is rotated by a wrench inserted in the socket 35 to move the drawback member 20 backwardly on the body 10 to complete the grip of the collet on the device within it. The cross head block 17 is shorter than the distance between it and adjacent parts of the body 10 to provide clearances 19 (Fig. 2) so that it may move laterally when the pin is rotated.

Figure 4:
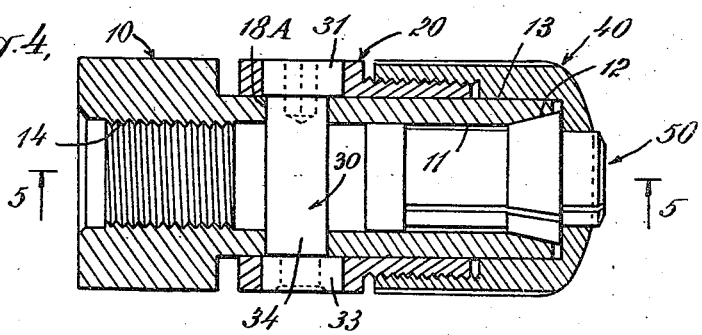
Fig. 4 is a view similar to Fig. 1 illustrating a collet chuck of somewhat simplified construction.
Figure 5:
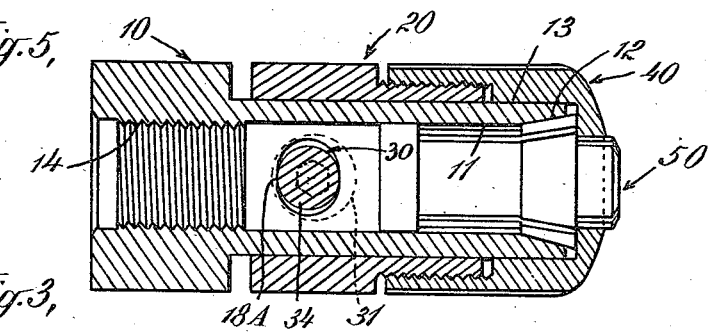
Fig. 5 is a sectional elevation of a part of the construction shown in Fig. 4, the section being taken on the line 5—5 of Fig. 4.
Figure 3:
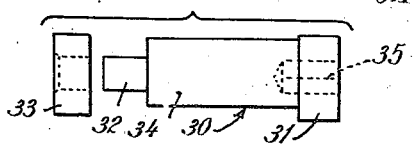
Fig. 3 is an elevation of a detail of construction showing a transverse pin and bushing separated from each other.

In the chuck shown in Fig. 4 the cross head is omitted and the intermediate part 34 of the pin directly engages slots 18A in the body. These slots fit the part 34 of the pin in one plane and are elongated in a transverse plane, as shown in Fig. 5, to permit a transverse movement of the part 34 of the pin during the longitudinal movement of the drawback member on the body.

In Fig. 6 the drawback member 20A is extended beyond the forward end of the body and its forward end is provided with internal screw threads 25. In this case external threads 55 are formed on the collet to engage the threads 25 and the outer end of the collet has flattened sides 56 for the reception of a wrench. The operation of this device is similar to that described previously.

The type of chuck shown in Fig. 6 may be made without a cross head 17 and such a modification is illustrated in Fig. 7. A detailed description of the latter is not deemed necessary as its construction and operation will be readily understood by referring to the previous figures and the description thereof.

The invention may be applied to jaw-type chucks, as shown in Figs. 8 and 9. In Fig. 8 a conical opening 12A is formed in the forward end of the body 10A. 60 designates the clamping jaws which are held in angularly spaced relation by a spacer 61 of usual form threaded into the end of collar 40A. The outer surfaces of these jaws are tapered and curved transversely to fit the conical surface 12A and their inner edges are parallel with the axis of the body of the chuck. The collar 40A which is in threaded engagement with the drawback member 20 has a flange 43 which abuts the outer ends of the clamping jaws 60.

The jaws 60 may be moved inwardly on an interposed tool or other article by screwing the collar onto the drawback member. Further tightening of the jaws is obtained in the manner previously described, by rotating the pin 30.

In the chuck shown in Fig. 10 the clamping jaws 60A are guided in longitudinal radially extending slots formed in the forward part of the body 10B and their inner ends abut against a transverse shoulder formed in the body 10B. The jaws are tapered oppositely to the direction of those shown in Fig. 8 and their outer surfaces abut a conical surface 12B formed in the collar 40B. The operation of this chuck is obvious.

I have shown and described several devices which embody this invention for illustrative purposes, but it is obvious that many structural modifications can be made within its spirit and scope. For this reason I intend no limitations other than those imposed by the appended claims.

What I claim is:

1. A chuck comprising a body having means for attachment to a machine tool, a drawback member slidably mounted on the outside of the body, tool gripping means, means threaded on the drawback member engaging the gripping means beyond the forward end of the body for forcing the gripping means inwardly into initial engagement with an article, and a pin passing transversely through the drawback member and the body and rotatively supported in the body, said pin having circular end portions on an axis eccentric to the axis of rotation of the pin seated in circular openings in the drawback member whereby rotative movement of the pin will impart a longitudinal movement in the same direction to the drawback member and the gripping means.

2. A chuck comprising a body having means for attachment to a machine tool, a drawback member longitudinally slidable on the outside of the body, tool gripping means, a collar in threaded engagement with the drawback member extending beyond the forward end of the body arranged when rotated to move the gripping means longitudinally and transversely inwardly into initial engagement with an article, and a pin passing transversely through the drawback member and the body and rotatively supported in the body, said pin having circular end portions on an axis eccentric to the axis of rotation of the pin, seated in circular openings in the drawback member whereby rotative movement of the pin will impart a longitudinal movement in the same direction to the drawback member and the gripping means.

3. A chuck comprising a body having a tapered orifice at its forward end and means for attachment to a machine tool, a drawback member on the outside of the body, tool gripping means having a tapered outer surface engaging the tapered orifice of the body, means threaded on the drawback member engaging the gripping means beyond the forward end of the body arranged when rotated to impart a longitudinal movement to the gripping means whereby the tapered outer surface thereof will be forced inwardly to move said gripping means into initial engagement with an article, and a pin passing transversely through the drawback member and the body and rotatively supported in the body, said pin having circular end portions on an axis eccentric to the axis of rotation of the pin seated in circular openings in the drawback member whereby rotative movement of the pin will impart longitudinal movement in the same direction to the drawback member and the gripping means.

4. A chuck comprising a body having a tapered orifice at its forward end and means for attaching the body to a machine tool, a drawback member longitudinally slidable on the outside of the body, a collet having an outer conical surface engaging the tapered orifice in the body, means engaging the collet beyond the forward end of the body adjustably connecting the collet with the drawback member, and a pin passing transversely through the drawback member and the body and rotatively supported in the body, said pin having circular end portions on an axis eccentric to the axis of rotation of the pin, seated in circular openings in the drawback member whereby rotative movement of the pin will impart a longitudinal movement in the same direction to the drawback member and the collet.

5. A chuck comprising a body having a tapered orifice at its forward end and means for attaching the body to a machine tool, a drawback member longitudinally slidable on the outside of the body, a collet having an outer conical surface engaging the tapered orifice in the body, means engaging the collet beyond the forward end of the body adjustably connecting the collet with the drawback member, a pin passing transversely through the drawback member and the body and rotatively supported in the body, said pin having circular end portions on an axis eccentric to the axis of rotation of the pin seated in circular openings in the drawback member, a cross head on the pin, and transverse guides in the body for the cross head.

6. A chuck comprising a body having a tapered orifice at its forward end and means for attaching the body to a machine tool, a drawback member longitudinally slidable on the outside of the body, a collet having an outer conical surface engaging the tapered orifice in the body, a collar in adjustable threaded engagement with the drawback member, said collar having a flange engaging the collet beyond the forward end of the body, and a pin passing transversely through the drawback member and the body and rotatively supported in the body, said pin having circular end portions on an axis eccentric to the axis of rotation of the pin seated in circular openings in the drawback member, with said eccentric axis fixed in relation to the body in one plane whereby rotative movement of the pin will impart a longitudinal movement to the drawback member on the body.

7. A chuck comprising a body having a tapered orifice at its forward end and means for attaching the body to a machine tool, a drawback member longitudinally slidable on the outside of the body, a collet having an outer conical surface at its forward end engaging the tapered orifice in the body, a collar in adjustable threaded engagement with the drawback member, said collar having a flange engaging the collet beyond the forward end of the body, a pin passing transversely through the drawback member and the body and rotatively supported in the body, said pin having circular end portions on an axis eccentric to the axis of rotation of the pin, seated in circular openings in the drawback member, a cross head on the pin, and transverse guides in the body for the cross head.

8. A chuck comprising a body having a tapered orifice at its forward end and means for attaching the body to a machine tool, a drawback member slidably mounted on the outside of the body, a collet having an outer conical surface at its forward end arranged to be brought into coactive engagement with the tapered orifice in the body, a collar interconnecting the drawback member and the collet, said drawback member having an externally threaded portion, internal threads on the collar arranged to engage the threads on the drawback member, a pin passing transversely through the drawback member and the body and rotatively supported in the body, said pin having circular end portions on an axis eccentric to the axis of rotation of the pin, seated in circular openings in the drawback member with said eccentric axis fixed in relation to the body in one plane whereby rotative movement of the pin will impart a longitudinal movement to the drawback member on the body.

9. A chuck comprising a body having a tapered orifice at its forward end and means for attaching the body to a machine tool, a drawback member slidably mounted on the outside of the body, a collet having an outer conical surface at its forward end arranged to be brought into coactive engagement with the tapered orifice in the body, a collar, said drawback member having an externally threaded portion, internal threads on the collar arranged to engage the threads on the drawback member, a pin passing transversely through the drawback member and the body and rotatively supported in the body, said pin having circular end portions on an axis eccentric to the axis of rotation of the pin seated in circular openings in the drawback member, a cross head on the pin, and transverse guides on the body for the cross head.

10. A chuck comprising a body having means for attachment to a machine tool, a drawback member slidably mounted on the outside of the body, a plurality of angularly spaced gripping jaws beyond the forward end of the body, a collar in threaded engagement with the drawback member arranged when rotated to force said jaws into initial engagement with an article, and a pin passing transversely through the drawback member and the body and rotatively supported in the body, said pin having circular end portions on an axis eccentric to the axis of rotation of the pin seated in circular openings in the drawback member whereby rotative movement of the pin will impart a longitudinal movement to the drawback member on the body.

11. A chuck comprising a body having means for attachment to a machine tool, a drawback member slidably mounted on the outside of the body, a plurality of angularly spaced gripping jaws abutting the forward end of the body, said jaws having tapered outer surfaces, a collar in threaded engagement with the drawback member having an internal conical cam surface arranged to contact the tapered surfaces of the gripping jaws and arranged when rotated to move said jaws inwardly into initial engagement with an interposed article, and a pin passing transversely through the drawback member and the body and rotatively supported in the body, said pin having circular end portions on an axis eccentric to the axis of rotation of the pin seated in circular openings in the drawback member whereby rotative movement of the pin will impart a longitudinal movement to the drawback member on the body.

12. A chuck comprising a body member having means for attachment to a machine tool and a collar member, a cone shaped cam surface on one of said members and an abutment surface on the other member, a relatively slidable drawback element supported by the body member in threaded engagement with the collar, a collet interposed between the body and the collar having a tapered portion arranged to be engaged by said cam surface and a surface arranged to be engaged by said abutment surface, and a pin passing through the drawback element and the body rotatively supported by the body, circular end portions of the pin being eccentric to the axis of rotation of the pin and seated in circular openings in the drawback element.

13. A chuck comprising a body having means for attachment to a machine tool and a cone shaped cam surface, a collar having a transverse abutment surface, a relatively slidable drawback element supported by the body in threaded engagement with the collar, a collet interposed between the body and the collar having a tapered portion arranged to be engaged by said cam surface and a transverse surface arranged to be engaged by said abutment surface, and a pin passing through the drawback element and the body rotatively supported by the body, circular end portions of the pin being eccentric to the axis of rotation of the pin and seated in circular openings in the drawback element.

ARTHUR MERRICK STONER.